United States Patent Office 3,328,423
Patented June 27, 1967

3,328,423
α-(3-INDOLYL)-CYCLOPROPYL LOWER
ALIPHATIC ACIDS
Tsung-Ying Shen, Westfield, N.J., assignor to Merck &
Co., Inc., Rahway, N.J., a corporation of New Jersey
No Drawing. Filed Mar. 23, 1965, Ser. No. 442,152
10 Claims. (Cl. 260—326.12)

This application is a continuation-in-part of my copending application, Serial No. 310,454, now abandoned, filed September 20, 1963, which is a continuation-in-part of my copending application, Serial No. 164,615, filed January 5, 1962, now abandoned, which is a continuation-in-part of my application, Serial No. 97,434, filed March 22, 1961, now abandoned.

This invention relates to new chemical compounds. More particularly, it relates to a new class of compounds of the indole series. Still more particularly, it is concerned with new α-(3-indolyl)-cyclopropyl lower aliphatic acids having an aromatic carboxylic acyl radical of less than three fused rings attached to the nitrogen atom of the indole ring. It is concerned further with salts, esters, anhydride and primary amide derivatives of such compounds. It relates also to the synthesis of such substances.

The new aroyl and heteroaroyl indolyl cyclopropyl and cyclopropylalkyl aliphatic acid compounds and derivatives thereof of this invention have the general structural formula:

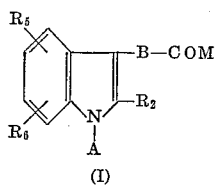

(I)

where:

A is an aromatic carboxylic acyl radical of less than three fused rings;
B is a cyclopropyl group, a substituted cyclopropyl group, a cyclopropylalkyl group, or a substituted cyclopropylalkyl group;
$R_2$ is hydrogen, lower alkyl, lower alkenyl, cycloalkyl, aryl or aralkyl;
$R_5$ is hydrogen, lower alkyl, lower alkoxy, nitro, amino, lower alkylamino, di(lower alkyl)amino, lower alkanoylamino, lower alkanoyl, lower alkylamino, bis(hydroxy lower alkyl)amino, 1-pyrrolidino, 4-methyl-1-piperizinyl, 4-morpholinyl, cyano, amino, lower alkyl, di(lower alkyl)amino, lower alkyl, trifluoromethyl, halogen, di(lower alkyl)sulfamyl, benzylthio, lower alkylbenzylthio, lower alkoxy benzylthio, halogenobenzylthio, benzyloxy, lower alkylbenzyloxy, lower alkoxybenzyloxy, halogenobenzyloxy, lower alkenyl, lower alkenyloxy, 1-aza-cyclopropyl, cyclopropylmethyloxy or cyclobutylmethyloxy;
$R_6$ is hydrogen, lower alkyl, lower alkoxy, fluorine or trifluoromethyl;
M is hydroxyl, primary amino, alkoxy, alkenylkoxy, aroxy, aralkoxy, alkaroxy, cycloalkoxy and alkeneoxy, including methoxy, ethoxy, n-butoxy, t-butoxy, ethoxyethoxy, phenoxy, benzyloxy, diphenylmethoxy, triphenylmethoxy, cyclopropoxy, β-diethylaminopropoxy, β-dimethylaminoethoxy, phenethoxy, allyloxy, isopropoxy, β-N-morpholinoethoxy, cyclopropylmethoxy, and tetrahydrofurfuryloxy; and OY where Y is a cation, or

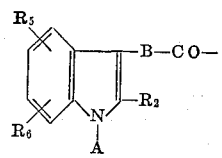

where $R_2$, $R_5$, $R_6$ and B are as defined above.

Accordingly, the compounds of the invention assume the following general structural formulas:

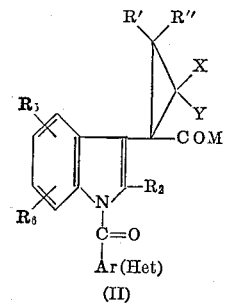

(II)

and

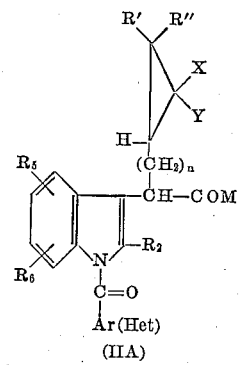

(IIA)

where:

R' and R'' are selected from among hydrogen, alkyl, haloalkyl, alkylthioalkyl, dialkylaminoalkyl, and alkoxyalkyl;
Ar is benzene, naphthalene, biphenyl, or a substituted benzene, naphthalene or biphenyl radical.
Het is a five- or six-membered heteroaromatic ring, preferably of less than three fused rings. Examples of such radicals are the furyl, thienyl, pyrryl, thiazolyl, thiadiazolyl, pyrazinyl, pyridyl, pyrazolyl, imidazolyl, oxazolyl, pyrimidinyl and isoxazolyl rings; and benz derivatives thereof, such as benzimidazolyl, quinolinyl and the like, which may be substituted as in Ar;
X and Y are selected among hydrogen, halogen and alkoxy;
n ranges from 0–4; and
$R_2$, $R_5$, $R_6$ and M are as defined above.

Typical preferred structural formulas in accordance with the invention have the following:

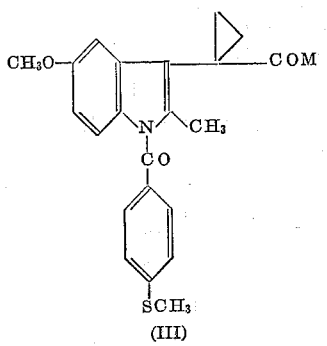

(III)

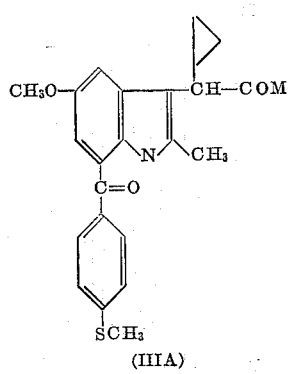

(IIIA)

In the most preferred compounds of the invention, $R_5$ is a lower alkyl, lower alkoxy, halogen, nitro, amino, or substituted amino. Examples of the alkyl and alkoxys are methyl, ethyl, propyl, t-butyl, methoxy, ethoxy, 1-propoxy and the like. $R_5$ is not limited to this class of substituents, however, and may, if desired, represent substituents such as hydrogen, aryl, aryloxy, hydroxy, mercapto, halo, haloalkyl, such as $CF_3$, $CHF_2$ or other haloalkyls, nitro, amino, alkylamino, acylamino, haloalkyl, cyano, dilower alkyl sulfamyl, sulfamyl, sulfoxide, aminomethyl, substituted aminomethyl, carboxy, carboalkoxy groups.

A critical feature of the new compounds described herein is the presence of an aroyl radical attached to the N-1 position of the indole. These acyl groups may be further substituted in the aromatic ring with hydrocarbon groups or with functional substituents. Thus, suitable aroyl substituents are the benzoyl, phenylbenzoyl and naphthoyl groups. The rings of such groups may contain, and in the preferred compounds do contain, at least one functional substituent. This substituent may be a hydroxy or an etherified hydroxy (hydrocarbonoxy) group such as a lower alkoxy, e.g., methoxy, ethoxy, isopropoxy, propoxy, an alkenyloxy such as allyloxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and arylthio or aralkylthio groups, e.g., benzylthio and phenylthio. The N-1 aroyl radical may, if desired, be haloalkylated, as with a trifluoromethyl, trifluoroethyl, perfluoroethyl, β-chloroethyl, or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or diallkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N-1 aroyl radical is benzoyl and the functional substituent is in the para position of the six-membered ring.

The α-(3-indolyl)-cyclopropyl aliphatic acids described herein are among the useful compounds of the invention. Esters, salts, anhydride and the primary amide of such aliphatic acids represent an additional aspect of the invention. The esters are important intermediates in the synthesis of the free acids, and in many cases are themselves of importance as end products. The preferred esters are the lower alkyl esters such as the methyl, ethyl, propyl or t-butyl compounds and the benzyl, p-halobenzyl and like esters.

The salts of these new α-(1-aroyl or heteroaroyl-3-indolyl)-lower aliphatic acids can be obtained by treatment of the free acid with base under mild conditions. In this manner there may be obtained alkaline metal salts such as the sodium and potassium, the aluminum or magnesium salts or salts of alkaline earth metals, examples of which are barium and calcium. The primary amides included within this invention are conveniently synthesized by first preparing the primary amide of an α-(3-indolyl)-cyclopropyl lower aliphatic acid unsubstituted at the 1-position and then acylating said compound by the process described hereinbelow. Such an amide is conveniently obtained by treating the appropriate acid chloride with ammonia.

The 2-position of the indole ring nucleus ($R_2$ in the above formula) may be hydrogen although it is preferred that there be present at this position of the molecule a hydrocarbon radical having less than nine carbon atoms. Lower alkyl groups such as methyl, ethyl, propyl or butyl are the most satisfactory, but lower alkenyl radicals also can be used.

The following compounds are representative of those contemplated by this invention and which may be prepared by the procedure discussed hereinbelow:

Methyl-α-(1-p-chlorobenzoyl-2-methyl-5-methoxy-3-indolyl)-α-cyclopropylacetate,
Methyl-α-(1-p-chlorobenzoyl-2,5-dimethyl-3-indolyl)-α-cyclopropylmethyl acetate,
Methyl-α-(1-p-methylthiobenzoyl-2-methyl-5-methoxy-3-indolyl-α-cyclopropyl-acetate,
β-Diethylaminoethyl-α-(1-p-chlorobenzoyl-2-methyl-5-methoxy-3-indolyl)-β,β-difluorocyclopropane-α-carboxylate,
t-Butyl-α-(1-methylthiobenzoyl-2-methyl-5-methoxy-3-indolyl)-β,β-difluorocyclopropane-α-carboxylate,
Methyl-α-(1-p-chlorobenzoyl-2-methyl-5-nitro-3-indolyl)-β,β-difluorocyclopropane-α-carboxylate,
α-(1-p-chlorobenzoyl-2-methyl-5-methoxy-3-indolyl)-β-(2',2'-difluorocyclopropyl)-propionamide,
Benzyl-α-(1-p-methylthiobenzoyl-2-methyl-5-fluoro-3-indolyl)-β-(2',2'-difluorocyclopropyl)-propionate,
Ethyl-α-(1-p-methylthiobenzoyl-2-methyl-5-benzyloxy-3-indolyl)-β,β-difluorocyclopropane-α-carboxylate,
Sodium-α-(1-p-chlorobenzoyl-2-methyl-5-dimethylsulfamyl-3-indolyl)-β,β-difluorocyclo propane-α-carboxylate,
α-(1-p-chlorobenzoyl-2-methyl-5-methyl-3-indolyl)-β-(2',2'-difluorocyclopropyl)-propionite acid anhydride,
Methyl-α-(1-p-methylthiobenzoyl-2-phenyl-5-fluoro-3-indolyl)-β,β-diflurorocyclopropane-α-carboxylate,
Methyl-α-(1-p-chlorobenzoyl-2-methyl-5-methoxy-3-indolyl)-β-(2',2'-difluoro-3'-methyl-cyclopropyl)-propionate,
Methyl-α-(1-p-chlorobenzoyl-2-methyl-5-fluoro-3-indolyl)-β,β-difluoro-γ-methyl-cyclopropane-α-carboxylate and α-(1-α'-thienoyl-2-methyl-5-methoxy-3-indolyl)-β,β-
dichloro cyclopropane-α-carboxylic acid.

The α-(1-aroyl or heteroaroyl-3-indolyl)-α-cyclopropyl and α-cyclopropylalkyl-lower aliphatic acid and derivative compounds of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic and analgesic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 10–2000 mg. per day are useful in control of arthritic conditions, depending on the activity of the specific compound and the reaction sensitivity of the patient.

Compounds of Formula II wherein the alpha carbon atom of the acetic acid is part of the cyclopropyl group are synthesized according to the process shown in Flow Sheet 1 below:

FLOW SHEET 1

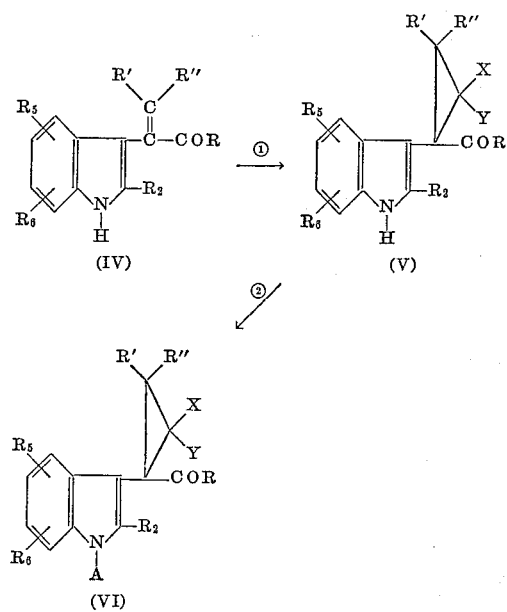

*Step 1*

Cyclopropanization: E.g., addition of a carbene to an olefin.

Equivalents: —COR is an ester or amide (see definition of M above).

Starting materials: Formation of a Wittig type reagent, such as triphenylphosphonium alkene,

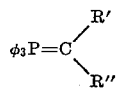

where R' and R'' are selected from hydrogen, alkyl, halo, haloalkyl, alkoxyalkyl, alkylthioalkyl, and dialkylaminoalkyl, in situ by reaction of triphenylphosphine with an alkyl halide

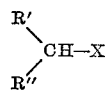

preferably the bromide, followed by the treatment of a strong base, such as n-butyl lithium, in an inert solvent, such as ether; condensation of this reagent with the corresponding glyoxyl compound, preferably the glyoxalate or glyoxalamide, in an inert solvent (—COR is an ester or amide group).

The Witting reaction (Step 1) provides a conversion of the keto group of the glyoxalate or glyoxalamide (V) into a carbon to carbon double bond, to produce the unsaturated ester or amide (VI).

*Step 2*

Acylation: See Text.

Remarks: The order of Steps 1 and 2 can be reversed.

The α-(3-indolyl)-unsaturated aliphatic esters and amides (IV) employed herein as starting materials in Flow Sheet 1 are α-(3-indolyl) derivatives of acrylic, crotonic, pent-2-enoic, hex-2-enoic, 3-methyl-pent-2-enoic, and the like acids, and halo, alkoxyalkyl, dialkylaminoalkyl, and alkylthioalkyl derivatives thereof. These compounds are prepared preferably by a Wittig type condensation of the corresponding α-3-indolyl glyoxalate or glyoxalamide with a Wittig reagent, such as an alkyltriphenylphosphonium halide. The Wittig reaction provides a conversion of the keto group of the glyoxalate or glyoxalamide into a carbon to carbon double bond.

The 3-indolyl glyoxalates and glyoxalamides utilized as precursors in the process outlined in Flow Sheet 1 for the preparation of the starting materials are prepared in the manner described by Speeter in U.S. Patent 2,825,734.

In accordance with the present invention, the formation of the cyclopropyl ring (Step 1) is carried out by addition of a carbene across the olefinic bond of the unsaturated acid side chain of IV. The carbene fragment is preferably formed in situ in solution. Accordingly, the starting compound on which the cyclopropyl ring is to be formed is first dissolved in a solvent. Suitable solvents are benzene, dimethylformamide ethers, such as dimethoxyethane, tetrahydrofuran, diglyme and dioxane, and hydroxylic solvents, such as water and alcohol.

The carbene forming precursors which may be used herein for generating carbenes in situ during the reaction are well known in the art. Such carbenes include carbene itself, :CH$_2$, fluorocarbene, :CHF, difluorocarbene, :CF$_2$, dichlorocarbene, :CCl$_2$, dibromocarbene, :CBr$_2$, chlorofluorocarbene, :CClF, alkoxycarbene, ROCH:, alkoxyhalocarbene, ROCX:, carboethoxycarbene, :CCOOR and diphenylcarbene, (C$_6$H$_5$)$_2$C:. A wide variety of methods have been described in the literature for generating these carbenes from such starting materials. For example, reaction of chlorodifluoromethane with a base produces difluorocarbene (Hire and Tanabe, Journal of American Chemical Society, 80, 3002, 1958). Other methods include pyrolysis of a diazoalkane or a chlorodifluoroacetate. These and other methods for generating carbenes have been described in the exhaustive treatment afforded carbene chemistry in Chem. Revs. 235 (1963).

The α-(1-aroyl or heteroaroyl-3-indolyl)-lower aliphatic acids and derivatives thereof (VI) described herein then are synthesized by acylation of the α-(3-indolyl)-lower aliphatic ester or amide having the desired substituents at the 2- and 5-positions of the ring nucleus. In those cases where the free acid is desired, the ester may be converted under suitable reaction conditions to the free acid. It has been observed that the 1-aroyl or heteroaroyl substituent is easily hydrolyzed under conditions normally employed for saponification of an ester to the free acid. For this reason, care must be taken in converting the α-(1-aroyl or heteroaroyl-3-indolyl)-lower aliphatic acid esters to the corresponding free acids. It has been found that one convenient method of accomplishing this conversion comprises acylation of the benzyl ester and subsequent hydrogenolytic removal of the benzyl ester. Alternatively, other esters such as the t-butyl esters, which are amenable to selective removal by other treatment, such as heating above 210° C. or by heating at 25–110° C. in the presence of a catalytic amount of an aryl sulfonic acid or other acids may be utilized. When, instead of an ester, the amides of these acids are prepared, the free acids are formed by reaction of the amides with a stoichiometric quantity of nitrous acid in an inert solvent.

The acylation reaction is preferably conducted by treating the α-(3-indolyl)-lower aliphatic acid starting material with an alkali metal hydride such as sodium hydride to form e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. This latter is prepared by mixing the acid and p-nitrophenol in tetrahydrofuran and adding dicyclohexyl carbodiimide in tetrahydrofurane slowly. The dicyclohexylurea which forms is removed by filtration and the nitrophenylester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the nitrophenylester.

Compounds of the structural Formula IIA, wherein the cyclopropyl group is part of a cyclopropylalkyl group which is attached to the alpha carbon of the acetic acid side chain, may be prepared in the manner described in Flow Sheet 2 below:

FLOW SHEET 2

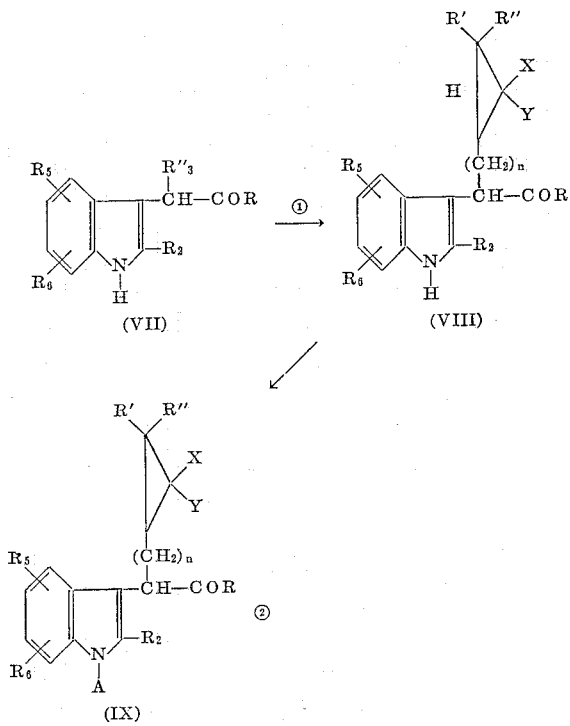

(IX)

*Steps 1 and 2*

Cyclopropanization and Acylation: As in Flow Sheet 1.
Equivalents: $n$ ranges from 0–4. $R''_3$ is a lower alkenyl or substituted lower alkenyl radical.
Remarks: The order of Steps 1 and 2 can be reversed.
The starting compounds (VII) in this sequence may be prepared from the corresponding unsubstituted acetic acid compounds as follows:

(1) Condensation of α-(3-indolyl)-acetate precurser and a diloweralkyl oxalate, with a strong base, e.g., Na alkoxide in an inert solvent, e.g., lower alkanol at elevated temperatures, e.g., at 80°.

(2) Pyrolysis: Elevated temperature, e.g., 100–200°, in presence of powered glass (loss of CO).

(3) Alkylation: $R''_3X$ as alkylating agent, $R''_3$ is lower alkenyl or substituted derivatives thereof, such as with halogen, alkoxy and dialkylamino, alkylthio, and X is a halogen, in a solvent in presence of base.

(4a) Hydrolysis and Decarboxylation of substituted malonic ester—as is well known in the art.

(4b) Esterification or Amidation of α-substituted α-(3-indolyl)-acetic acid. (—COR is an ester or amide.)

The following examples illustrate methods of carrying out the present invention but it is to be understood that these examples are given for purposes of illustration and not of limitation.

EXAMPLE 1

*Ethyl-α-(1-p-methylthiobenzoyl-2-methyl-5-methoxy-3-indolyl)-α-cyclopropylcarboxylate*

A. *Ethyl-α-(2-methyl-5-methoxy-3-indolyl)-arcylate.*— 500 ml. of dry ether, 36.02 g. of methyltriphenylphosphonium bromide, made from equivalent amounts of triphenylphosphine and methyl bromide, and 94.36 ml. of 1.10 N n-butyl lithium are stirred for one hour at room temperature under nitrogen. 38 g. of ethyl-(2-methyl-5-methoxy-3-indolyl)-glyoxylate in 260 ml. of benzene and 500 ml. of dry ether are added, and stirring continued for one hour. The reaction mixture then is transferred to a pressure flask and heated in a closed flask at 65–70° C. for five hours. The liquid is poured from the pressure flask and the gum triturated with 500 ml. of 33% benzene in ether. The solutions are combined and washed with three 500 ml. portions of water, dried over sodium sulfate, filtrated and concentrated in vacuo to a syrup. The syrup is slurried in benzene and charged onto a 200 g. column of activated alumina. Ethyl-α-(2-methyl-5-methoxy-3-indolyl)-acrylate is eluted by washing the column with 30% ether in petroleum ether and removing the eluting solvents by evaporation.

B. 1.2 g. of ethyl-α-(2-methyl-5-methoxy-3-indolyl)-acrylate in 10 ml. of dry tetrahydrofuran is added to 4 g. of diiodomethane, 1.25 g. of zinc-copper couple and 0.2 g. of iodine in 20 ml. of dry tetrahydrofuran. The mixture is refluxed under nitrogen with stirring for 20 hours. The reaction mixture is then filtered, the filtrate added to ice water, and the whole extracted with three 50-ml. portions of ether. The combined ether extracts are washed with two 50-ml. portions of water, dried over sodium sulfate, filtered and concentrated. The syrup thus obtained is poured onto a 60 g. alumina column as a slurry in benzene. Ethyl-α-(2-methyl-5-methoxy-3-indolyl)-α-cyclopropylcarboxylate is collected from the column by elution with 60% ether-petroleum ether.

C. 13g. of ethyl-α-(2-methyl-5-methoxy-3-indolyl)-cyclopropylcarboxylate is added to a mixture of 2.5 g. of 51% sodium hydride-mineral oil emulsion in 240 ml. of dimethylformamide. The resulting mixture is stirred at room temperature for 30 minutes and then a solution of 8.75 g. of p-methylthiobenzoyl chloride in 150 ml. of dimethylformamide is added slowly thereto over a 40-minute period. The mixture is then stirred in an ice-bath overnight under nitrogen. It is then poured into 1 liter of iced-water containing 2 ml. of acetic acid and extracted with ether. The ether extract is then wased with water, dried over sodium sulfate and concentrated to a residue. The residue is then chromatographed on a column of 1 lb. of acid washed alumina and the product eluted with 15% ether-petroleum ether to give ethyl-α-(1-p-methylthiobenzoyl - 2 - methyl - 5 - methoxy-3-indolyl)-α-cyclopropylcarboxylate.

In a similar manner:

t-Butyl-α-(1-p-chlorobenzoyl-2-methyl-5-methoxy-3-indolyl)acrylate,
t-Butyl-α-(1-p-methylthiobenzoyl-2-methyl-5-methoxy-3-indolyl)acrylate,
Methyl-α-(1-p-chlorobenzoyl-2-methyl-5-nitro-3-indolyl)acrylate,
t-Butyl-α-(1-p-methylthiobenzoyl-2-methyl-5-benzyloxy-3-indolyl)acrylate,
Methyl-α-(1-p-chlorobenzoyl-2-methyl-5-dimethylsulfamyl-3-indolyl)acrylate, and
Methyl-α-(1-p-methylthiobenzoyl-2-phenyl-5-fluoro-3-indolyl)acrylate are reacted to give:

t-Butyl-α-(1-p-chlorobenzoyl-2-methyl-5-methoxy-3-indolyl)-cyclopropane-α-carboxylate,
t-Butyl-α-(1-p-methylthiobenzoyl-2-methyl-5-methoxy-3-indolyl)-cyclopropane-α-carboxylate,
Methyl-α-(1-p-chlorobenzoyl-2-methyl-5-nitro-3-indolyl)-cyclopropane-α-carboxylate,
t-Butyl-α-(1-p-methylthiobenzoyl-2-methyl-5-benzyloxy-3-indolyl)-cyclopropane-α-carboxylate,
Methyl-α-(1-p-chlorobenzoyl-2-methyl-5-dimethylsulfamyl-3-indolyl)-cyclopropane-α-carboxylate, and
Methyl-α-(1-p-methylthiobenzoyl-2-phenyl-5-fluoro-3-indolyl)-cyclopropane-α-carboxylate.

EXAMPLE 2

The procedure of Example 1C is followed using equivalent quantities of the following aroyl and heteroaroyl chlorides in place of p-methylthiobenzoyl chloride:

Benzoyl chloride,
p-Methylbenzoyl chloride,
p-Chlorobenzoyl chloride,
3,3,5-trimethoxybenzoyl chloride,
p-Phenoxybenzoyl chloride,
p-Trifluoroacetylbenzoyl chloride,
p-N,N-dimethylsulfamylbenzoyl chloride,
3-furoyl chloride,
1-methylimidazol-5-carboxylic acid chloride,
1,3-dimethyl-2,3-dihydro-2-oxoimidazole-4-carboxylic acid chloride,
1-methyl-benzimidazole-2-carboxy chloride,
5-fluoro-2-thenoyl chloride,
3-thenoyl chloride,
5-nitro-2-furoyl chloride,
1-methyl-indazole-3-carboxy chloride,
1-methyl-6-nitroindazole-3-carboxy chloride,
Oxazole-4-carboxy chloride,
Benzoxazole-2-carboxy chloride,
Thiazole-4-carboxy chloride,
Thiazole-2-carboxy chloride,
2-phenylthiazole-4-carboxy chloride,
2-benzyl-mercaptothiazole-4-carboxy chloride,
p-Acetylbenzoyl chloride,
N,N-dimethyl-p-carboxamidebenzoyl chloride,
p-Cyanobenzoyl chloride,
p-Carbomethoxybenzoylchloride,
p-Formylbenzoyl chloride
p-Trifluoromethylthiobenzoyl chloride,
N,N-dimethyl-p-sulfonamidobenzoyl chloride,
p-Methylsulfinylbenzoyl chloride,
p-Methylsulfonylbenzoyl chloride,
p-Benzylthiobenzoyl chloride,
p-Mercaptobenzoyl chloride,
p-Nitrobenzoyl chloride,
p-Dimethylaminobenzoyl chloride,
p-Trifluoromethylbenzoyl chloride,
p-Acetaminobenzoyl chloride,
o-Fluoro-p-chlorobenzoyl chloride,
o-Methoxy-p-chlorobenzoyl chloride,
o-Hydroxy-p-chlorobenzoyl chloride and
2,4,5-trichlorobenzoyl chloride, to produce the corresponding N–1 aroyl and N–1 heteroaroyl derivatives of ethyl-α-(2-methyl-5-methoxy-3-indolyl)-α-cyclopropylcarboxylate.

EXAMPLE 3

The procedure of Example 1 is followed using equivalent quantities of the following starting materials in place of ethyl-α-(2-methyl-5-methoxy-3-indolyl)-glyoxalate:

Ethyl-α-(2-ethyl-5-methyl-3-indolyl)-glyoxalate;
Ethyl-α-(2-methyl-5-trifluoromethyl-3-indolyl)-glyoxalate,
Ethyl-α-(2-butyl-5-benzyloxy-3-indolyl)-glyoxalate,
Ethyl-α-(2-phenyl-5-methoxy-3-indolyl)-glyoxalate,
Ethyl-α-(2-p-methoxy-phenyl-5-chloro-3-indolyl)-glyoxalate,
α-(2-methyl-5-fluoro-3-indolyl)-glyoxalamide,
Ethyl-α-(2-cyclopropylmethyl-5-methyl-3-indoyl)-glyoxalate,
α-(2-p-chloro-phenyl-5-methoxy-3-indolyl)-glyoxalamide,
α-(5-methoxy-3-indolyl)-glyoxalamide,
Ethyl-α-(5-benzyloxy-3-indolyl)-glyoxalate,
α-(2-methyl-5-butyloxy-3-indolyl)-glyoxalamide,
α-(5-ethoxy-3-indolyl)-glyoxalamide,
Ethyl-α(2-benzyl-5-methoxy-3-indolyl)-glyoxalate,
t-Butyl-α-(5-benzyloxy-6-methyl-3-indolyl)-glyoxalate,
Propyl-α-(6-methoxy-3-indolyl)glyoxalate,
Methyl-α-(2-methyl-α-2-methyl-5-nitro-6-fluoro-3-indolyl)-glyoxalate,
α-(5-benzyloxy-6-trifluoromethyl-3-indolyl)-glyoxalamide,
Ethyl-α-(2-methyl-5-nitro-3-indolyl)-glyoxalate,
Ethyl-α-(2-methyl-5-acetyl-3-indolyl)-glyoxalate,
Ethyl-α-(2-methyl-5-butyryl-3-indolyl)glyoxalate,
Ethyl-α-(2-methyl-5-bis(benzyloxyethyl)amino-3-indolyl)-glyoxalate,
Ethyl-α-(2-methyl-5-bis(benzyloxybutyl)amino-3-indolyl)-glyoxalate,
Ethyl-α-(2-methyl-5-bis(benzyloxypentyl)amino-3-indolyl)-glyoxalate,
Ethyl-α-(2-methyl-5-(1-pyrrolidino)-3-indolyl)-glyoxalate,
Ethyl-α-(2-methyl-5-(4-methyl-1-piperazinyl)-3-indolyl)-glyoxalate,
Ethyl-α-(2-methyl-5-(4-morpholinyl)-3-indolyl)-glyoxalate,
Ethyl-α-(2-methyl-5-trifluoromethyl-3-indolyl)-glyoxalate,
Ethyl-α-(2-methyl-5-trifluoromethyl-3-indolyl)-glyoxalate,
Ethyl-α-(2-methyl-5-chloro-3-indolyl)-glyoxalate,
Ethyl-α-(2-methyl-5-bromo-3-indolyl)-glyoxalate,
Ethyl-α-(2-methyl-5-fluoro-3-indolyl)-glyoxalate,
Ethyl-α-(2-methyl-5-dimethylsulfamyl-3-indolyl)-glyoxalate,
Ethyl-α-(2-methyl-5-dipropylsulfamyl-3-indolyl)-glyoxalate,
Ethyl-α-(2-methyl-5-benzylthio-3-indolyl)-glyoxalate,
Ethyl-α-(2-methyl-5-p-methylbenzylthio-3-indolyl)-glyoxalate,
Ethyl-α-(2-methyl-5-p-propylbenzylthio-3-indolyl)-glyoxalate,
Ethyl-α-(2-methyl-5-p-pentyl-benzylthio-thio-3-indolyl)-glyoxalate,
Ethyl-α-(2-methyl-5-p-methoxybenzylthio-3-indolyl)-glyoxalate,
Ethyl-α-(2-methyl-5-p-propoxybenzylthio-3-indolyl)-glyoxalate,
Ethyl-α-(2-methyl-5-p-pentoxy-benzylthio-3-indolyl)-glyoxalate,
Ethyl-α-(2-methyl-5-p-chlorobenzylthio-3-indolyl)-glyoxalate,
Ethyl-α-(2-methyl-5-p-bromobenzylthio-3-indolyl)-glyoxalate,
Ethyl-α-(2-methyl-5-p-fluorobenzylthio-3-indolyl)-glyoxalate,
Ethyl-α-(2-methyl-5-benzyloxy-3-indolyl)-glyoxalate, Ethyl-α-(2-mehtyl-5-p-methylbenzyloxy-3-indolyl)-glyoxalate,
Ethyl-α-(2-methyl-5-p-propylbenzyloxy-3-indolyl)-glyoxalate,
Ethyl-α-(2-methyl-5-p-pentylbenzyloxy-3-indolyl)-glyoxalate,
Ethyl-α-(2-methyl-5-p-methoxybenzyloxy-3-indolyl)-glyoxalate,
Ethyl-α-(2-methyl-5-p-propoxybenzyloxy-3-indolyl)-glyoxalate,
Ethyl-α-(2-methyl-5-p-pentyloxybenzyloxy-3-indolyl)-glyoxalate,
Ethyl-α-(2-methyl-5-p-chlorobenzyloxy-3-indolyl)-glyoxalate,
Ethyl-α-(2-methyl-5-bromobenzyloxy-3-indolyl)-glyoxalate,
Ethyl-α-(2-methyl-5-p-fluorobenzyloxy-3-indolyl)-glyoxalate,
Ethyl-α-(2-methyl-5-cyclopropylmethoxy-3-indolyl)-glyoxalate,
Ethyl-α-(2-methyl-5-cyclopropylpropoxy-3-indolyl)-glyoxalate,
Ethyl-α-(2-methyl-5-methyloxy-3-indolyl)-glyoxalate,
Ethyl-α-(2-methyl-5-cyclobutylmethoxymethyloxy-3-indolyl)-glyoxalate,
Ethyl-α-(2-methyl-5-cyclobutyl-propoxymethyloxy-3-indolyl)-glyoxalate,
Ethyl-α-(2-methyl-5-cyclobutylpentoxy-methyloxy-3-indolyl)-glyoxalate,
Ethyl-α-(2-methyl-5-N,N-dimethylcarbamyl-3-indolyl)-glyoxalate, and
Ethyl-α-(2-methyl-5-butyl-3-indolyl)-glyoxalate.

to produce the corresponding substituted final products.

EXAMPLE 4

The procedure of Example 1 is followed using the following alkyl bromides in place of methyl bromide; ethyl bromide, propyl bromide, butyl bromide, sec-butyl bromide and iso-propyl bromide to the following compounds:

Ethyl-2-(1-p-methylthiobenzoyl-2-methyl-5-methoxy-3-indolyl)-crotonate,
Ethyl-2-(1-p-methylthiobenzoyl-2-methyl-5-methoxy-3-indolyl)-pent-2-enoate,
Ethyl-2-(1-p-methylthiobenzoyl-2-methyl-5-methoxy-3-indolyl)-hex-3-enoate,
Ethyl-2-(1-p-methylthiobenzoyl-2-methyl-5-methoxy-3-indolyl)-3-methylpent-2-enoate, and
Ethyl-2-(1-p-methylthiobenzoyl-2-methyl-5-methoxy-3-indolyl)-β-methyl-crotonate.

When these compounds are carried through the procedures of 1-B and 1-C, the corresponding α-(1-aroyl-3-indolyl)-α-cyclopropylaliphatic esters are obtained.

When the aroyl and hetero-aroyl chlorides used in Example 2 are employed in place of p-methylthiobenzoyl chloride, there are produced the corresponding N–1 aroyl and N–1 heteroaroyl derivatives of the above compounds.

EXAMPLE 5

The procedure of Example 1 is followed using the following substituted alkyl halides in place of methyl bromide: 3-chloropropyl bromide, 3-fluoropropyl bromide, 1,1,1-trifluoro-4-bromobutane, 3-methoxypropyl bromide, 3-methylthiopropyl bromide and 3-dimethylaminopropyl bromide to produce the corresponding compounds:

Ethyl-2-(1-p-methylthiobenzoyl-2-methyl-5-methoxy-3-indolyl)-4-chloro-pent-2-enoate,
Ethyl-2-(1-p-methylthiobenzoyl-2-methyl-5-methoxy-3-indolyl)-5-fluoro-pent-2-enoate,
Ethyl-2-(1-p-methylthiobenzoyl-2-methyl-5-methoxy-3-indolyl)-6,6,6-trifluorohex-2-enoate,
Ethyl-2-(1-p-methyl-thiobenzoyl-2-methyl-5-methoxy-3-indolyl)-5-methoxy-pent-2-enoate,
Ethyl-2-(1-p-methylthiobenzoyl-2-methyl-5-methoxy-3-indolyl)-5-methylthio-pent-2-enoate, and
Ethyl-2-(1-p-methylthiobenzoyl-2-methyl-5-methoxy-3-indolyl)-5-dimethylamino-pent-2-enoate.

When equivalent quantities of these compounds are carried through the procedure of 1B and 1C, the corresponding α-(1-aroyl-3-indolyl)-α-cyclopropylaliphatic esters are obtained.

When the aroyl and heteroaroyl chlorides used in Example 2 are employed in place of p-methylthiobenzoyl chloride, there are produced the corresponding N–1 aroyl and N–1 heteroaroyl derivatives of the above compounds.

EXAMPLE 6

*Methyl-α-(1-p-chlorobenzoyl-2-methyl-5-methoxy-3-indolyl)-β,β-difluorocyclopropane-α-carboxylate*

A mixture of methyl-α-(2-methyl-5-methoxy-3-indolyl)-acrylate (0.05 mole) and 0.10 mole of the sodium salt of chlorodifluoroacetic acid in 100 cc. of 1,2-dimethoxyethane is heated in an autoclave at 100°–150° with agitation for four hours. The solution is filtered, concentrated in vacuo to a syrup and chromatographed on a column of 400 g. of acid washed alumina using ether-petroleum ether (v./v. 10–30%) as eluent. The product is methyl - α - (2 - methyl - 5 - methoxy - 3 - indolyl)-β,β-difluorocyclopropane-α-carboxylate, which is then p-chlorobenzoylated as in 1–C.

When equivalent amounts of the p-chlorobenzoyl chloride derivative of methyl-α-(2-methyl-5-methoxy-3-indolyl)-α-acrylate is employed as starting material in the above procedure, the corresponding 1-p-chlorobenzoyl derivative is obtained.

The same product is obtained when the steps above are reversed.

The procedure above is employed using the following in place of the 3-indolyl materials used above:

t-Butyl-α-(1-p-chlorobenzoyl-2-methyl-5-methoxy-3-indolyl)acrylate,
t-Butyl-α-(1-p-methylthiobenzoyl-2-methyl-5-methoxy-3-indolyl)acrylate,
Methyl-α-(1-p-chlorobenzoyl-2-methyl-5-nitro-3-indolyl)acrylate,
t-butyl-α-(1-p-methylthiobenzoyl-2-methyl-5-benzyloxy-3-indolyl)acrylate,
Methyl-α-(1-p-chlorobenzoyl-2-methyl-5-dimethylsulfamyl-3-indolyl)acrylate,
Methyl-α-(1-p-methylthiobenzoyl-2-phenyl-5-fluoro-3-indolyl)acrylate, to give
t-Butyl-α-(1-p-chlorobenzoyl-2-methyl-5-methoxy-3-indolyl)-β,β-difluorocyclopropane-α-carboxylate,
t-Butyl-α-(1-p-methylthiobenzoyl-2-methyl-5-methoxy-3-indolyl)-β,β-difluorocyclopropane-α-carboxylate,
Methyl-α-(1-p-chlorobenzoyl-2-methyl-5-nitro-3-indolyl)-β,β-difluorocyclopropane-α-carboxylate,
t-Butyl-α-(1-p-methylthiobenzoyl-2-methyl-5-benzyloxy-3-indolyl)-β,β-difluorocyclopropane-α-carboxylate,
Methyl-α-(1-p-chlorobenzoyl-2-methyl-5-dimethylsulfamyl-3-indolyl)-β,β-difluorocyclopropane-α-carboxylate, and
Methyl-α-(1-p-methylthiobenzoyl-2-phenyl-5-fluoro-3-indolyl)-β,β-difluorocyclopropane-α-carboxylate.

EXAMPLE 7

The procedure of Example 6 is followed using dichlorofluoroacetic acid as a carbene precurser in place of chlorodifluoroacetic acid to give methyl-α-(1-p-chlorobenzoyl-2-methyl - 5 - methoxy - 3 - indolyl) - β - chloro - β - fluoro-cyclopropane-α-carboxylate.

EXAMPLE 8

*Methyl-α-(2-methyl-5-fluoro-3-indolyl)-β,β-dichlorocyclopropane-α-carboxylate*

To a mixture of 0.05 mole of methyl-α-(2-methyl-5-fluoro-3-indolyl)-acrylate and 0.011 mole of potassium-butoxide in 150 cc. of dimethoxyethane is added dropwise a solution of 0.2 mole of chloroform in 1,2-dimethoxyethane with stirring and ice cooling. The mixture is then stirred at room temperature for 18 hours, filtered, concentrated to a small volume, poured into water and extracted with ether. The ether extract is evaporated, redissolved in 300 cc. of methanol containing 0.2 mole of sodium methoxide and allowed to stand at room temperature for 18 hours. The mixture is concentrated to a small volume, poured into water, and extracted with ether. The ether extract is purified to give methyl-α-(2-methyl-5-fluoro-3-indolyl)-β,β-dichlorocyclopropane-α-carboxylate.

The above is then aroylated and heteroaroylated according to the procedure of Example 1C.

In a similar manner, t-Butyl-α-(2-methyl-5-methoxy-3-indolyl)acrylate,
t-Butyl-α-(2-methyl-5-methoxy-3-indolyl)acrylate,
Methyl-α-(2-methyl-5-nitro-3-indolyl)acrylate,
t-Butyl-α-(2-methyl-5-benzyloxy-3-indolyl)acrylate,
Methyl-α-(2-methyl-5-dimethylsulfamyl-3-indolyl) acrylate, and
Methyl-α-(2-phenyl-5-fluoro-3-fluoro-3-indolyl)-acrylate, provide the following compounds:

t-Butyl-α-(1-p-chlorobenzoyl-2-methyl-5-methoxy-3-indolyl)-β,β,dichlorocyclopropane-α-carboxylate,
t-Butyl-α-(1-p-methylthiobenzoyl-2-methyl-5-methoxy-3-indolyl)-β,β,dichlorocyclopropane-α-carboxylate,
Methyl-α-(1-p-chlorobenzoyl-2-methyl-5-nitro-3-indolyl)-β,β-dichlorocyclopropane-α-carboxylate,
t-Butyl-α-(1-p-methylthiobenzoyl-2-methyl-5-benzyloxy-3-indolyl)-β-dichlorocyclopropane-α-carboxylate,
Methyl-α-(1-p-chlorobenzoyl-2-methyl-5-dimethylsulfamyl-3-indolyl)-β-dichlorocyclopropane-α-carboxylate, and
Methyl-α-(1-p-methylthiobenzoyl-2-phenyl-5-fluoro-3-indolyl)-β,β-dichlorocyclopropane-α-carboxylate.

EXAMPLE 9

The procedure of Example 8 is followed using equivalent quantities of the following carbene precursers in place of chlorodifluoromethane: chloroform, bromoform, dichlorofluoromethane and dichloromethane (with n-butyllithium in place of potassium t-butoxide) to provide the halogen substituted cyclopropane compounds.

EXAMPLE 10

*Ethyl-α-(1-p-methylthiobenzoyl-2-methyl-5 - methoxy - 3-indolyl)-β-(2-ethoxycarbonylcyclopropyl)-propionate*

A. Ethyl-α-(1-p-Methylthiobenzoyl-2-Methyl-5-Methoxy-3-Indolyl)-α-Allyl Acetate (1) *Ethyl α-ethoxy oxalyl-α-(2-methyl - 5 - methoxy-3-indolyl) acetate.*—To a solution of 2.3 g. of sodium in 200 ml. of dry ethanol is added 0.15 mole of diethyl oxalate and 0.1 mole of ethyl 2-methyl-5-methoxy-3-indolyl acetate. The mixture is refluxed gently on a steam bath for 2 hours and then cooled to room temperature. After dilution with 800 ml. of ether the precipitate is collected on a filter, washed with ether and dissolved in dilute sulfuric acid (1 N). The aqueous solution is extracted with three 100 ml. portions of ether. The ethereal solution is dried over sodium sulfate and evaporated to obtain the product.

(2) *Diethyl 2-methyl-5-methoxy-3-indolyl malonate.*—The above glyoxalate is heated in an oil bath at 150–200° in the presence of powdered glass under nitrogen until the evolution of carbon monoxide is complete. The residual oil is purified by chromatography in a silica gel column using ether-pet-ether (v./v. 50–100%) as eluent to obtain the product.

(3) *Diethyl allyl-(2 - methyl-5 - methoxy - 3 - indolyl) malonate.*—To a solution 0.11 mole of sodium ethoxide and 0.1 mole of the above malonate in 300 ml. of dry ethanol is added dropwise 0.11 mole of allyl bromide with stirring. The mixture is then stirred at room temperature until neutral to phenolphthalein. The solution is concentrated in vacuo to about 100 ml., poured into water and extracted with ether. The ethereal solution is dried over sodium sulfate, evaporated and chromatographed on a silica gel column using ether-pet-ether (v./v. 20–60%) as eluent.

(4) *α-(2-methyl-5-methoxy-3-indolyl) - α - allyl acetic acid.*—The above malonate (0.05 mole) is dissolved in 150 ml. 90% aqueous ethanol containing 0.2 mole of sodium hydroxide and the solution is allowed to stand at room temperature for 18 hours. The solution is diluted with 100 ml. water, concentrated in vacuo to about 150 ml., poured into water, acidified with dilute sulfuric acid and warmed in a steam bath until the evolution of carbon dioxide is complete. The solution is cooled and extracted with ether. After drying over sodium sulfate, the ethereal solution is evaporated to obtain the product.

(5) *Methyl α-(2-methyl-5-methoxy-3-indolyl)-α - allyl acetate.*—The above acid is converted to its methyl ester by the treatment of 5% sulfuric acid in methanol at reflux temperature for 1 hour.

(6) The procedure of Example 1–C is followed using equivalent quantities of the above ester and p-methylthiobenzoyl chloride to produce the desired N-aroyl product.

B. A mixture of ethyl-α-(1 - p - methylthiobenzoyl - 2-methyl-5-methoxy-3-indolyl)-α-allyl-acetate (0.02 mole) and 0.02 mole of ethyldiazoacetate in 200 ml. of 1,2-dimethoxy ethane is irradiated with a U. V. light under an atmosphere of nitrogen until the evolution of nitrogen is complete. The solution is concentrated in vacuo to a syrup and chromatographed on 100 g. of acid-washed alumina using ether-pet-ether (v./v. 10–50%) as eluent to give ethyl-α-(1-p-methylthiobenzoyl-2-methyl-5-methoxy-3-indolyl)-β-(2-ethoxycarbonylcyclopropyl) - propionate.

EXAMPLE 11

The procedure of Example 10 is followed using equivalent quantities of the following alkyl halides in place of allyl bromide in the alkylation step A–3: methallyl bromide, crotyl bromide, 4-methoxycrotyl bromide, 4-methylthiocrotyl bromide, and 4-trifluoromethylcrotyl bromide and the aroylation procedure of 1–C and Example 2 to provide the 1-aroyl and 1-heteroaroyl derivatives of the corresponding esters and amides.

EXAMPLE 12

*Methyl-α((p-trifluoromethyl)-benzoyl-2-methyl-5-hydroxy-3-indolyl)-cyclopropane carboxylate*

A mixture of 0.05 mole of methyl-α-(p-trifluoromethylbenzoyl-2-methyl-5-benzyloxy-3-indolyl) - cyclopropane carboxylate in 200 ml. of ethanol is hydrogenated over 10% palladium-carbon catalyst at 45 p.s.i. at room temperature until 0.05 mole of hydrogen is absorbed. The mixture then is filtered, evaporated in vacuo, chromatographed on a silica gel column (500 g.) using ether-petroleum (v./v. 50–100%) as eluent. The solvent is evaporated and the product recovered.

EXAMPLE 13

*Methyl-(1-p-chlorobenzoyl-2-methyl-5-dimethylamino-3-indolyl)-β-β-difluorocyclopropane-α-carboxylate*

To a solution of 0.387 g. of methyl-α-(1-p-chlorobenzoyl-2-methyl-5-nitro-3-indolyl) - β-β - (difluorocyclopropane-α-carboxylate in 20 ml. of distilled dimethoxyethane is added 1.5 ml. of glacial acetic acid and 0.5 ml. of a 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to an oil.

EXAMPLE 14

*Ethyl-α-(1-p-methylthiobenzoyl-2-methyl-5-methoxy-3-indolyl)-β-cyclopropyl propionate*

The procedure of Example 10 is followed using an equivalent amount of diazomethane in place of ethyl diazoacetate in Step B of the reaction to obtain ethyl-α-(1-p-methylthiobenzoyl-2-methyl-5-methoxy-3-indolyl)-β-cyclopropyl propionate.

Similarly, when the halides of Example 11 are used in place of allyl bromide in Step A3 of Example 10 and diazomethane is used in place of ethyl diazoacetate in Step B of Example 10, the corresponding substituted cyclopropyl compounds are obtained.

EXAMPLE 15

The procedure of Example 10 is followed using isobutylene and a trace of hydroquinone in place of methanol in Step A5 to form t-butyl-α-(1-p-methylthiobenzoyl-2-methyl-5-methoxy-3-indolyl)-β-(2-ethoxycarbonylcyclopropyl) propionate.

Similarly, when the t-butyl ester is reacted in accordance with Step B of Example 10 using diazomethane in place of ethyl diazoacetate, there is obtained t-butyl-α-(1-p-methylthiobenzoyl-2-methyl-5-methoxy-3-indolyl)-β-cyclopropyl propionate.

EXAMPLE 16

*α-(1-p-chlorobenzoyl-2-methyl-5-methoxy-3-indolyl)-cyclopropane-α-carboxylic acid*

A mixture of 1 g. of t-butyl-α-(1-p-chlorobenzoyl-2-methyl-5-methoxy-3-indolyl)-cyclopropane-α-carboxylate and 0.1 g. of powdered porous plate is heated in an oil bath at 210° C. with magnetic stirring under a blanket of nitrogen for 2 hours. The reaction mixture is then cooled under a blanket of nitrogen and the product dissolved in benzene and ether, filtered and extracted with sodium bicarbonate solution. The aqueous solution is then filtered with suction to remove any remaining ether, neutralized with acetic acid and then acidified weakly with dilute hydrochloric acid. The crude product is recrystallized from aqueous ethanol and dried in vacuo to yield α-(1-p-chlorobenzoyl-2-methyl-5-methoxy-3-indolyl)-cyclopropane-α-carboxylic acid.

Similarly, when the t-butyl esters obtained from Examples 1, 6, 8 and 15 are used in place of t-butyl-α-(1-p-chlorobenzoyl-2-methyl-5-methoxy-3-indolyl)-cyclopropane-α-carboxylate, there are obtained the corresponding α-carboxylic acids and propionic acids, respectively.

What is claimed is:
1. A compound of the formula

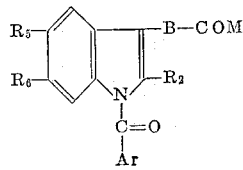

wherein:

Ar is selected from the group consisting of phenyl and substituted phenyl wherein said substituent is selected from the group consisting of lower alkylthio, halo, phenoxy, trifluorolower alkenoyl, N,N-dilower, alkyl sulfamyl, lower alkanoyl, carboxamido, cyano, lower alkoxycarbonyl, formyl, trifluoromethylthio, N,N-dilower alkyl sulfonamido, lower alkyl sulfinyl, benzylthio, mercapto, nitro, dilower alkylamino, lower alkyl carboxamido, hydroxy, 2,4,5-trihalo, lower alkyl sulfonyl, lower alkoxy and lower alkyl;

$R_2$ is selected from the group consisting of lower alkyl, hydrogen, phenyl, lower alkoxyphenyl, lower alkyl cyclopropyl, halophenyl, lower alkoxy and benzyl;

$R_5$ is selected from the group consisting of lower alkoxy, nitro, benzyloxy, lower alkyl benzyloxy, lower alkoxy benzyloxy, dilower alkyl sulfamyl, halo, trifluoromethyl, lower alkyl, hydrogen, lower alkanoyl, bis(benzyloxy lower alkyl)amino, 1-pyrrolidino, 4-lower alkyl-2-piperazinyl, 4-morpholinyl, benzylthio, lower alkyl benzylthio, lower alkoxy benzylthio, halobenzylthio, cyclopropyl lower alkoxy, cyclobutyl lower alkoxymethyloxy, N,N-dilower alkyl carbamyl, hydroxy and dilower alkylamino;

$R_6$ is selected from the group consisting of hydrogen, lower alkyl, lower alkoxy, halo and trifluoromethyl;

B is selected from the group consisting of cyclopropyl, substituted cyclopropyl, wherein the substituent is selected from the group consisting of lower alkyl, dilower alkyl, halolower alkyl, trifluoromethyllower alkyl, lower alkoxy lower alkyl, lower alkylthio lower alkyl, di(lower alkylamino) lower alkyl, halo and dihalo; cyclopropyl lower alkyl, and substituted cyclopropyl lower alkyl, wherein the substituent is selected from the group consisting of lower alkoxycarbonyl, lower alkyl, lower alkoxy, lower alkylthio and trifluoromethyl; and M is selected from the group consisting of hydroxy, lower alkoxy and amino.

2. A compound of claim 1 wherein Ar is p-halophenyl; $R_2$ is lower alkyl; $R_5$ is lower alkoxy; $R_6$ is hydrogen; M is hydroxy, and B is cyclopropyl.

3. A compound of claim 1 wherein Ar is p-halophenyl; $R_2$ is lower alkyl; $R_5$ is lower alkoxy; $R_6$ is hydrogen; M is hydroxy, and B is cyclopropyl lower alkyl.

4. A compound of claim 1 wherein Ar is p-lower alkylthiophenyl; $R_2$ is lower alkyl; $R_5$ is lower alkoxy; $R_6$ is hydrogen; M is hydroxy, and B is cyclopropyl.

5. A compound of claim 1 wherein Ar is p-lower alkylthiophenyl; $R_2$ is lower alkyl; $R_5$ is lower alkoxy; $R_6$ is hydrogen; M is hydroxy, and B is cyclopropyl lower alkyl.

6. α-(1-p-chlorobenzoyl-2-methyl-5-methoxy-3-indolyl)-cyclopropane-α-carboxylic acid.

7. α-(1-p-chlorobenzoyl-2-methyl-5-methoxy-3-indolyl)-β-cyclopropyl propionic acid.

8. α-(1-p-methylthiobenzoyl-2-methyl-5-methoxy-3-indolyl)-cyclopropane-α-carboxylic acid.

9. α-(1-p-methylthiobenzoyl-2-methyl-5-methoxy-3-indolyl)-β-cyclopropyl propionic acid.

10. α-(1-p-chlorobenzoyl-2-methyl-5-dimethylamino-3-indolyl)-β-cyclopropyl propionic acid.

No references cited.

ALEX MAZEL, *Primary Examiner.*

HENRY R. JILES, *Examiner.*

MARY U. O'BRIEN, *Assistant Examiner.*